Patented June 13, 1933

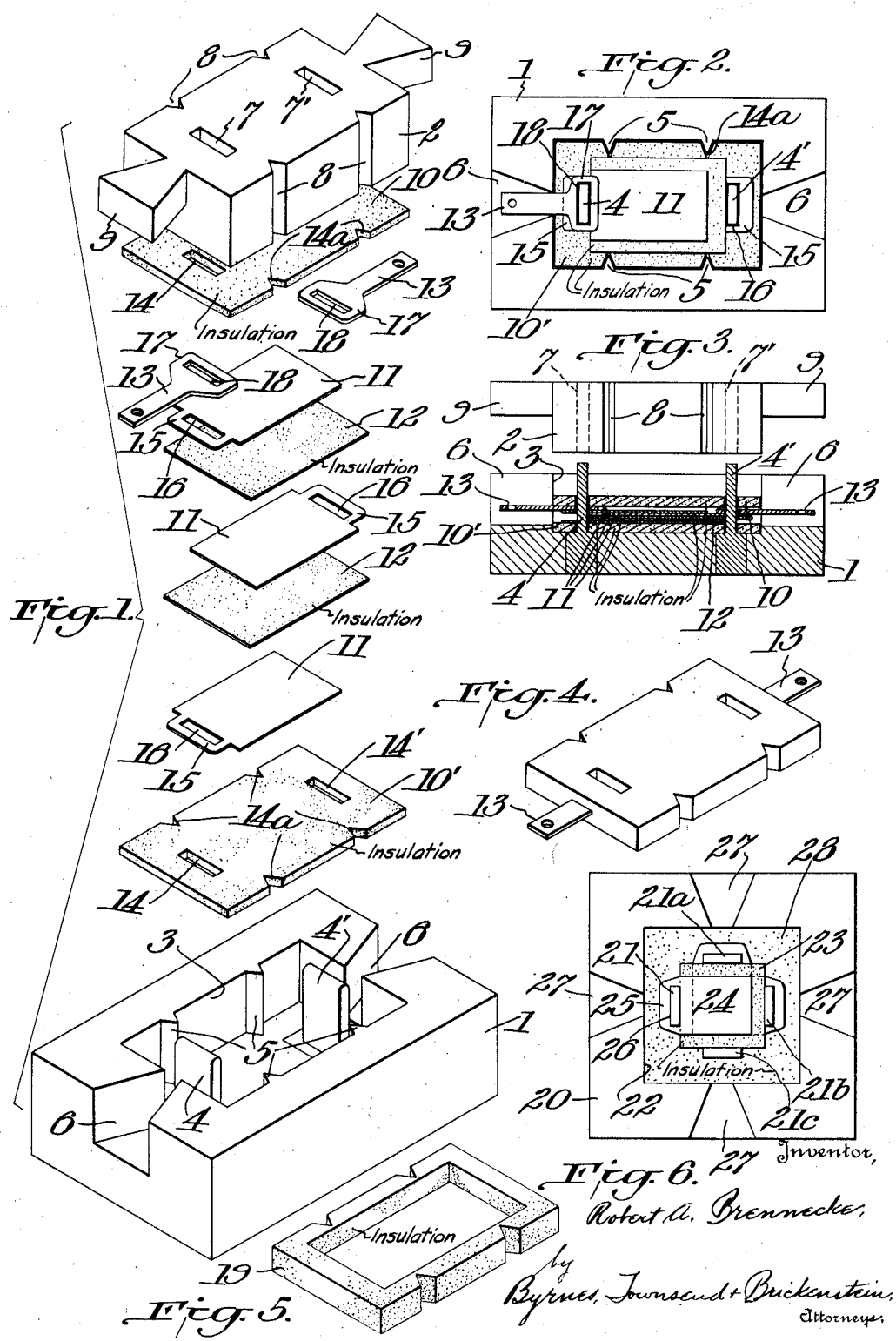

1,913,473

UNITED STATES PATENT OFFICE

ROBERT A. BRENNECKE, OF EVANSTON, ILLINOIS

MOLDED ARTICLE

Application filed October 7, 1929. Serial No. 398,031.

This invention relates to a molded article, such, for example, as an electrical condenser of the type now used in radio work, and to the method of and apparatus for forming the same; and it embodies improvements over the inventions disclosed in my co-pending applications Serial No. 53,659, filed August 31, 1925 and Serial No. 174,373, filed March 10, 1927, of which this application is a continuation in part.

Although, as hereinbefore indicated the invention is not limited to electrical condensers, such devices lend themselves readily to its characteristics, and I will proceed therefore to describe the invention in its application to the production of these devices, particularly such as are used in radio work.

Molded electrical condensers, especially those of the type mentioned, are made of an assembly of conducting metal plates with insulating members interposed between them. Such assembly is then provided with terminal lugs and encased or enclosed by a molding process in a sheath or cover of plastic molding composition, such as a suitable synthetic resin.

Molding compositions of this type are usually supplied to the user in powder form, either loose or compacted into briquettes or tablets. In this form the molding composition (synthetic resin) is very free flowing in the presence of the heat and pressure customarily employed in the molding operation, and presents a disadvantage in that, due to this free-flowing characteristic, it tends to force its way between the several conducting plates and their alternated insulating sheets, thereby being apt to cause a variation in the capacity of the condensers formed.

Furthermore molding powders of the heat reactive type always generate gases as polymerization takes place during the molding process. It is commonly known that while some of the gases escape, appreciable quantities are imprisoned in the molding material itself. These quantities form gas pockets in the molded material, varying in size from microscopic volumes to pockets of sufficient size as to be visible to the naked eye after cutting a section through a molded piece. Such gases may collect at the edges or in the vital electrical assembly composing the alternate metallic conducting plates and dielectric plates, causing variations or non-uniformity of capacitance. In addition there is always air between the particles of molding powder as it is placed in the mold. Due to the relative coarseness of the powder the air is present whether the powder is used loosely or preformed into a hard biscuit or block. This air accentuates the difficulty due to gasing by adding its volume in varying proportions to the gases. Furthermore, molding powders, due to their inherent plasticity under the application of heat, permit the electrical elements in the condenser to float or shift during the molding process. This brings about unevenness in the thickness of the outside insulating shell and a tendency on the part of the electrical elements to distort or twist somewhat out of the true plane which further tends to produce variations in capacity.

To eliminate these difficulties I use for the outside molding shell, fibrous sheet materials such as paper, fabrics or other porous sheeting that may be obtained in reasonably uniform thicknesses and coat or impregnate the same with a fusible resin such as the synthetic resinoids known in the plastic arts.

I prefer, however, to use a molding paper (not rolled powder sheeting) which has a synthetic resin incorporated during the manufacture of the paper, the resin being added to the pulp in the beaters of the paper making machine since in such a product more uniform relation is obtained between the fibrous particles and synthetic resin.

One object of the present invention is to avoid this difficulty by making unnecessary the use of the molding plastic in powdered or free-flowing form.

Another object of the invention is to provide means, included in the molding apparatus and not forming a part of the finished molded article, whereby the several elements comprising the finished article may be correctly and accurately positioned and maintained in correct position during the assembling and molding operations.

Another object of the invention is to produce a condenser of such construction and having its elements so arranged that it may be used for any of a number of different predetermined capacities or for any number or all of such capacities.

With these and other objects in view, the invention contemplates a molded article, specifically an electrical condenser, comprising alternately arranged conducting plates and insulating members, the insulating members comprising essentially sheets of fibrous material such as paper, cloth or the like treated with a molding composition such as a synthetic resin, so that when the lamellar structure formed of the alternately arranged elements is subjected to a customary molding operation the molding composition will act to unite the several elements to form a unitary structure; and the invention contemplates also molding apparatus having certain physical characteristics whereby the assembling and molding operations are facilitated; and in a novel type of condenser, as I will proceed now to explain and finally claim.

In the accompanying drawing illustrating the invention, in the several figures of which like parts are similarly designated.

Fig. 1 is an expanded perspective view of the molding apparatus and a plurality of the various elements which, when arranged in proper relation, produce an electrical condenser in accordance with the principle of my invention.

Fig. 2 is a top plan view of the mold chase of the apparatus with a number of the elements of a condenser properly arranged therein.

Fig. 3 is a sectional elevation of the mold chase and force, the latter in elevation, showing elements for forming a complete condenser assembly arranged in the chase.

Fig. 4 is a perspective view of a finished condenser.

Fig. 5 is a perspective view of a frame member or auxiliary thickening element for use in producing condensers having a relatively large number of laminations.

Fig. 6 is a plan view of a mold chase of modified form adapted for the production of condensers of the type hereinbefore referred to having a plurality of separate capacities.

My apparatus, as illustrated in Figs. 1, 2 and 3, comprises a mold having a chase 1 and a force 2. The chase 1 is provided, in the form shown, with a substantially rectangular central cavity 3 in which are arranged upstanding broad, flat positioning pins 4 and 4'. The side walls of the cavity 3 are provided with locating means in the form of ribs 5. These ribs 5 may be formed integrally with the chase 1, as shown, or they may be in the form of inserts or pins, as desired, and they may be of any appropriate shape in cross-section.

As will be seen, particularly by reference to Fig. 3, the pins 4 and 4' have enlarged basal ends and are separable from the chase 1, thus providing means whereby the finished molded article may be removed from the chase.

Communicating with the cavity 3 at its ends are recesses 6 for a purpose later appearing.

The force 2 is in the form of a block of a size to properly fit within the cavity 3 of the chase and provided with openings 7 and 7' for cooperation with the pins 4 and 4'. Grooves 8 are provided in the sides of the force for cooperation with the ribs 5 of the chase, and extensions 9 are carried at its ends to fit within the recesses 6.

The condenser, in its simplest form, comprises similar top and bottom insulating members 10 and 10', alternately arranged metallic conducting members 11 and insulating sheets 12, and terminal lugs 13.

The top and bottom insulating members 10 and 10' are similar and interchangeable and comprise relatively thick sheets of paper, cardboard, cloth or other suitable fibrous material treated by coating, impregnation or incorporation during their manufacture with a suitable, temporarily fusible, resin binder, such as a phenolic condensation product or other suitable synthetic or natural resin or gum. The materials mentioned, of which the members 10 and 10' may be made, are procurable in the market in sheet form, and the members referred to may be formed therefrom by stamping with suitable dies.

These members 10 and 10' with their contained temporarily fusible resin binder will, when subjected to the molding operation customarily employed with binders of this character, compact and adhere into a unitary structure, the binder so acting as to join the elements by penetration, thus producing a finished article in which no evidences of its lamellar structure are apparent.

Moreover, due to their fibrous body and partially hardened or reacted binder content, these members 10 and 10' do not have the objectionable free-flowing characteristics of the molding powders hereinbefore referred to, and have comparatively no side flow, so that under the influence of molding pressure they compact mainly in the direction of application of pressure and the contained binder does not force its way between the conducting plates and insulating sheets as is sometimes the case when powders are used, thus eliminating the disadvantages of the free flowing plastics now commonly used for the molding of condensers.

The top and bottom insulating members 10 and 10' are of a surface area to snugly fit within the cavity 3 of the chase 1 and are provided with apertures 14 and 14' for reception of the pins 4 and 4', and notches 14a for cooperation with the ribs 5.

The members or sheets 12 are of a size to fit within the space defined by the opposed faces of the pins 4 and 4′ and the apexial edges of the ribs 5 and are thereby accurately and positively positioned within the cavity 3 of the chase.

The metallic conducting plates 11 are of less surface area than the sheets 12 and are provided with end extensions 15 apertured as indicated at 16 to fit the pins 4 and 4′ whereby they are properly positioned within the cavity 3 and located relatively to the sheets 12 so as to be surrounded on three sides or edges thereby.

The terminal lugs 13 are enlarged as indicated at 17 and provided with apertures 18 to fit the pins 4 and 4′ by which they are positioned.

The make-up or assembly of the various elements 10, 10′, 11, 12 and 13 within the cavity 3 of chase 1 is clearly illustrated in Figs. 2 and 3. First the bottom insulating member 10′ is placed within the cavity and resting upon the bottom thereof, then a conducting plate 11 is positioned upon this member 10′ with the aperture 16 of its extension 15 in engagement with one of the pins of the chase, in the instance shown the pin 4. Next an insulating member or sheet 12 is placed upon this plate 11, the sheet 12 being held in proper position within the cavity 3 by engagement of its edges with the opposed faces of the pins 4—4′ and the apexial edges of the ribs 5. Then another plate 11 is introduced into the cavity 3 with its apertured extension in positioning engagement with the pin 4′. It is to be noted in this connection that the pins 4 and 4′ being of nonsymmetrical cross-section and the apertures 16 of the plates 11 being of complemental shape, the plates when arranged upon the pins cannot change position within the cavity. Thus the plates 11 and insulating sheets 12 are alternately deposited in the cavity of the chase until a sufficient number of plates is assembled to produce a condenser of desired capacitance, it being understood that alternate plates 11 are alternately located by the pins 4 and 4′, respectively, thus providing, by virtue of the exensions 15, means whereby the two series of oppositely disposed plates 11 may be electrically connected.

After an assembly of plates to provide the desired capacitance has been thus built up in the cavity 3, the apertured enlargements 17 of the terminal lugs 13 are slipped over the pins 4 and 4′ and pressed down into contact with the extensions of the plates 11, their ends extending into the recesses 6 and then the top insulating member 10 is applied.

With the elements thus assembled in the chase, the force 2 is inserted in the cavity 3 and the molding operation performed under pressure, or heat and pressure. This operation forces the lugs 13 into intimate electrical contact with the extensions 15 of plates 11 and also forces these extensions into intimate electrical contact with each other.

It will be understood that the thickness of the plates 11 and sheets 12 is greatly exaggerated in the drawing, these elements being, in actual practice, approximately .002″, or less, in thickness. Thus it will be apparent that the spaces between superposed extensions 15 is very slight and very little movement of same is necessary to close them together.

The assembly just described will serve for condensers including up to approximately fifteen conducting plates 11. In case such a number is used the density of the protective insulating casing around its edges will be somewhat less than where substantially fewer plates are used due to the space between the members 10 and 10′ occasioned by the multiplicity of plates 11 and insulating sheets 12. However, such assembly is practicable up to the limit mentioned.

However, if more plates 11 are required, I find it advisable to use a filler frame 19 of treated fibrous material similar to members 10 and 10′ (see Fig. 5). This frame may be inserted in the chase at any time during the assembly of the condenser elements after positioning of member 10′ and before positioning of member 10.

The pressure, or heat and pressure, applied during the molding operation causes the treated insulating elements 10 and 10′ of the assembly, and element 19 if used, to unite and harden, thus imprisoning the other elements of the assembly ad providing an hermetically sealed protecting shell or casing of unusal strength, for greater than when powdered or non-laminated or non-fibrous assembling means are used. Moreover, the casing, being in effect integral after molding, affords thorough protection against moisture and other outside influences.

Obviously, the portions of the terminal lugs 13 which extend into the recesses 6 of the chase serve, in the finished condenser, as shown in Fig. 4, as a means for electrical connection of same in a circuit.

The external configuration of the finished condenser shown is merely illustrative, it being apparent that it may take various shapes, and the characteristics of the mold may be altered to produce any shape desired. Furthermore, the mold may be made in a plurality of sections as the shape of the condenser to be formed and the molding requirements dictate.

The terminal lugs 13 are metallic stampings, and the plates 11 may be made of sheet metal or of foil, as desired.

The insulating members or sheets 12 may be made of sheet mica, treated paper, or other thin dielectric materials such as are commonly used in condenser construction.

Referring now to Fig. 6, it will be seen that

I have shown therein a method of and means for constructing in a simple and economical manner, and in a unitary structure, a condenser in which several separate values of capacitance may be obtained.

This type of condenser embodies the same features of construction, in so far as the arrangement of its parts generally is concerned, as that illustrated in Figs. 1 to 4, but in the apparatus for molding this multiple capacitance condenser, I provide a mold chase 20 having, instead of the two pins used in the chase 1 of Fig. 1, four pins 21, 21$^a$, 21$^b$ and 21$^c$, one arranged adjacent to each of the four sides of and in the cavity 22 of the chase.

With this arrangement, it will be seen that these four pins may be used as a means for positioning the insulating members or sheets 23 in the cavity 22 thus dispensing with ribs such as those indicated at 5 in Fig. 1.

The conducting plates 24 have extensions 25 apertured as indicated at 26 to fit over the pins, and will be of such surface area as to only partly overlie the insulating sheets 23. Terminal lugs, not shown, similar to the lugs 13 of Fig. 1 will be provided for application to the four pins of the chase, their connection extensions lying in recesses 27 provided to receive them.

In forming a condenser of this type having several capacitances, I build up about the pins 21$^a$ and 21$^b$, a desired number of alternating metallic conducting plates 24 and insulating sheets 23, upon a bottom member 28, somewhat similar to the members 10 and 10'. The elements thus arranged will give one value of capacitance. On top of that assembly I may build up a different number of alternating metallic conducting plates 24 and insulating sheets 23 around the pins 21 and 21$^a$. This will give another value of capacitance. Similarly another capacitance can be added by using the pins 21$^b$ and 21$^c$ as a pair, and another by using pins 21$^c$ and 21 as a pair.

After this desired arrangement of conducting plates and insulating sheets has been made, a top insulating member, (not shown), similar to the member 28 is positioned in the chase upon the assembly of condenser elements, and the thus arranged members with their interposed condenser elements subjected to molding pressure.

As distinguished from the inventions disclosed in my copending applications hereinbefore mentioned, it will be seen that in the present invention, I require no frame member for properly positioning the various elements forming the condenser during their assembly, the elements, on the contrary, being positioned directly in and by the mold chase and its adjuncts.

Also, by providing members 10 and 10' with embodied molding composition (preferably synthetic resin), I obviate the necessity for the application of such molding composition, either in the form of a powder or compressed tablet or briquette, and provide for the production of a condenser of greater accuracy than it is possible to produce when such powdered molding composition is used, for the reasons hereinbefore given. Moreover, condensers constructed in accordance with the present invention have great strength and are not apt to break when rivets or other fastening means are applied.

Furthermore, having reference particularly to Fig. 6, it will be seen that I produce in a single condenser structure, a condenser having a choice of capacitances, and this I believe has not been done heretofore.

Various changes and modifications are considered to be within the spirit of the invention and the scope of the following claims.

I claim:

1. A molded article, specifically an electrical condenser, including insulating covering members of fibrous material, said covering members comprising a fibrous material with which, during that period of its manufacture in which it was in a pulpy condition, a molding composition was incorporated, and a condenser assembly interposed between said insulating members, said members molded into a unitary covering enclosing said condenser assembly.

2. An electrical condenser, comprising insulating covering members of a fibrous material, said covering members comprising a fibrous material with which during that period of its manufacture in which it was in a pulpy condition, a molding composition was incorporated, a plurality of superposed condenser assemblies of different capacitances interposed between said insulating members, said members molded into a unitary covering enclosing the condenser assemblies, and means whereby any of said assemblies may be used independently of the others.

3. A molded electrical condenser, comprising, in combination with a lamellar condenser assembly, fibrous insulating members treated with and embodying partially reacted phenol synthetic resin as a molding material, said molding material having been incorporated with the insulating members during their pulpy stage in manufacture, said members being subject to alteration during the molding operation to provide an insulating casing for said condenser assembly, said molding material due to its incorporation in the insulating members serving to unite such members without affecting the lamellar arrangement of the condenser assembly.

4. A molded article, specifically an electrical condenser, including molding paper insulating covering members, said molding paper comprising paper with which, during its manufacture a molding resin was incorporated, and a condenser assembly interposed between said insulating members, said members molded into a unitary covering enclosing said condenser assembly.

5. A molded article, specifically an electrical condenser, including insulating covering members of fibrous material, said covering members comprising a fibrous sheet material with which, during that period of its manufacture in which it was in a pulpy condition, a resin molding composition was incorporated, and a multiple condenser assembly interposed between said insulating members, said covering members being molded in situ into a unitary covering upon and enclosing said multiple condenser assembly.

In testimony whereof, I affix my signature.

ROBERT A. BRENNECKE.